(12) United States Patent
Longsdorf et al.

(10) Patent No.: US 7,627,441 B2
(45) Date of Patent: Dec. 1, 2009

(54) PROCESS DEVICE WITH VIBRATION BASED DIAGNOSTICS

(75) Inventors: Randy J. Longsdorf, Chaska, MN (US); Chad C. Blumeyer, Chaska, MN (US)

(73) Assignee: Rosemount Inc., Eden Prairie, MN (US)

( * ) Notice: Subject to any disclaimer, the term of this patent is extended or adjusted under 35 U.S.C. 154(b) by 0 days.

(21) Appl. No.: 10/675,014

(22) Filed: Sep. 30, 2003

(65) Prior Publication Data

US 2005/0072239 A1    Apr. 7, 2005

(51) Int. Cl.
*G05B 13/00* (2006.01)
*G01F 1/84* (2006.01)

(52) U.S. Cl. .................. 702/56; 702/183; 73/861.355; 700/280

(58) Field of Classification Search .................. 700/48, 700/50, 54, 79, 80, 280, 282; 706/6, 23; 702/54, 56, 76, 104, 182, 186; 340/566; 73/649, 658, 661, 861.354, 861.355, 861.356, 73/861.357
See application file for complete search history.

(56) References Cited

U.S. PATENT DOCUMENTS

| | | | |
|---|---|---|---|
| 3,096,434 A | 7/1963 | King ........................... 235/151 |
| 3,404,264 A | 10/1968 | Kugler ........................ 235/194 |
| 3,410,779 A | 11/1968 | Whitehead et al. .......... 204/408 |
| 3,468,164 A | 9/1969 | Sutherland ................... 73/343 |
| 3,590,370 A | 6/1971 | Fleischer .................... 324/51 |
| 3,618,592 A | 11/1971 | Stewart ................ 128/2.05 R |
| 3,688,190 A | 8/1972 | Blum ....................... 324/61 R |
| 3,691,842 A | 9/1972 | Akeley ...................... 73/398 C |
| 3,701,280 A | 10/1972 | Stroman ...................... 73/194 |
| 3,849,637 A | 11/1974 | Caruso et al. ............... 235/151 |
| 3,855,858 A | 12/1974 | Cushing ............... 73/194 EM |
| 3,948,098 A | 4/1976 | Richardson et al. ....... 73/861.24 |
| 3,952,759 A | 4/1976 | Ottenstein ..................... 137/12 |
| 3,964,296 A | 6/1976 | Matzuk ....................... 73/67.5 |
| 3,973,184 A | 8/1976 | Raber ........................... 324/51 |
| 4,043,008 A | 8/1977 | Weiss et al. ................. 204/408 |
| RE29,383 E | 9/1977 | Gallatin et al. ................. 137/14 |
| 4,058,975 A | 11/1977 | Gilbert et al. .............. 60/39.28 |
| 4,083,031 A | 4/1978 | Pharo, Jr. .................... 367/135 |
| 4,099,413 A | 7/1978 | Ohte et al. ..................... 73/359 |
| 4,102,199 A | 7/1978 | Talpouras .................... 73/362 |
| 4,122,719 A | 10/1978 | Carlson et al. ................ 73/342 |

(Continued)

FOREIGN PATENT DOCUMENTS

CA    999950    11/1976

(Continued)

OTHER PUBLICATIONS

"Notification of Transmittal of The International Search Report or the Declaration", PCT/US2004/25291.

(Continued)

*Primary Examiner*—Charles R Kasenge
(74) *Attorney, Agent, or Firm*—Westman, Champlin & Kelly, P.A.

(57) ABSTRACT

An process device for use in an industrial process control or monitoring system is configured to couple to a process. A vibration sensor is configured to sense vibrations. Diagnostic circuitry provides a diagnostic output based upon the sensed vibrations.

50 Claims, 3 Drawing Sheets

U.S. PATENT DOCUMENTS

| | | | |
|---|---|---|---|
| 4,249,164 A | 2/1981 | Tivy | 340/870.3 |
| 4,250,490 A | 2/1981 | Dahlke | 340/870.37 |
| 4,255,964 A | 3/1981 | Morison | 73/24.01 |
| 4,279,013 A | 7/1981 | Cameron et al. | 340/870.37 |
| 4,337,516 A | 6/1982 | Murphy et al. | 364/551 |
| 4,355,536 A | 10/1982 | McShane et al. | 73/633 |
| 4,383,443 A | 5/1983 | Langdon | 73/290 |
| 4,390,321 A * | 6/1983 | Langlois et al. | 417/15 |
| 4,393,711 A | 7/1983 | Lapides | 73/592 |
| 4,399,824 A | 8/1983 | Davidson | 128/736 |
| 4,417,312 A | 11/1983 | Cronin et al. | 364/510 |
| 4,423,634 A | 1/1984 | Audenard et al. | 73/587 |
| 4,446,741 A | 5/1984 | Sirokorad et al. | 73/654 |
| 4,448,062 A | 5/1984 | Peterson et al. | 73/86 |
| 4,459,858 A | 7/1984 | Marsh | 73/861.12 |
| 4,463,612 A | 8/1984 | Thompson | 73/861.22 |
| 4,517,468 A | 5/1985 | Kemper et al. | 290/52 |
| 4,528,869 A | 7/1985 | Kubo et al. | 74/695 |
| 4,530,234 A | 7/1985 | Cullick et al. | 73/53 |
| 4,536,753 A * | 8/1985 | Parker | 340/566 |
| 4,540,468 A | 9/1985 | Genco et al. | 162/49 |
| 4,571,689 A | 2/1986 | Hildebrand et al. | 364/481 |
| 4,630,265 A | 12/1986 | Sexton | 370/85 |
| 4,635,214 A | 1/1987 | Kasai et al. | 364/551 |
| 4,641,529 A | 2/1987 | Lorenzi et al. | 73/601 |
| 4,642,782 A | 2/1987 | Kemper et al. | 364/550 |
| 4,644,479 A | 2/1987 | Kemper et al. | 364/550 |
| 4,649,515 A | 3/1987 | Thompson et al. | 364/900 |
| 4,668,473 A | 5/1987 | Agarwal | 422/62 |
| 4,686,638 A | 8/1987 | Furuse | 364/558 |
| 4,696,191 A | 9/1987 | Claytor et al. | 73/600 |
| 4,707,796 A | 11/1987 | Calabro et al. | 364/552 |
| 4,720,806 A | 1/1988 | Schippers et al. | 364/551 |
| 4,736,367 A | 4/1988 | Wroblewski et al. | 370/85 |
| 4,736,763 A | 4/1988 | Britton et al. | 137/10 |
| 4,758,308 A | 7/1988 | Carr | 162/263 |
| 4,777,585 A | 10/1988 | Kokawa et al. | 364/164 |
| 4,807,151 A | 2/1989 | Citron | 364/510 |
| 4,818,994 A | 4/1989 | Orth et al. | 340/501 |
| 4,831,564 A | 5/1989 | Suga | 364/551.01 |
| 4,841,286 A | 6/1989 | Kummer | 340/653 |
| 4,853,693 A | 8/1989 | Eaton-Williams | 340/588 |
| 4,873,655 A | 10/1989 | Kondraske | 364/553 |
| 4,895,031 A | 1/1990 | Cage | 73/861.355 |
| 4,907,167 A | 3/1990 | Skeirik | 364/500 |
| 4,924,418 A | 5/1990 | Backman et al. | 364/550 |
| 4,926,364 A | 5/1990 | Brotherton | 364/581 |
| 4,934,196 A | 6/1990 | Romano | 73/861.38 |
| 4,939,753 A | 7/1990 | Olson | 375/107 |
| 4,964,125 A | 10/1990 | Kim | 371/15.1 |
| 4,988,990 A | 1/1991 | Warrior | 340/25.5 |
| 4,992,965 A | 2/1991 | Holter et al. | 364/551.01 |
| 5,005,142 A | 4/1991 | Lipchak et al. | 364/550 |
| 5,014,543 A | 5/1991 | Franklin et al. | 73/40.5 |
| 5,019,760 A | 5/1991 | Chu et al. | 318/490 |
| 5,025,344 A | 6/1991 | Maly et al. | 361/88 |
| 5,043,862 A | 8/1991 | Takahashi et al. | 364/162 |
| 5,047,990 A | 9/1991 | Gafos et al. | 367/6 |
| 5,051,743 A | 9/1991 | Orszulak | 340/870.04 |
| 5,053,815 A | 10/1991 | Wendell | 355/208 |
| 5,057,774 A | 10/1991 | Verhelst et al. | 324/537 |
| 5,067,099 A | 11/1991 | McCown et al. | 364/550 |
| 5,081,598 A | 1/1992 | Bellows et al. | 364/550 |
| 5,089,979 A | 2/1992 | McEachern et al. | 364/571.04 |
| 5,089,984 A | 2/1992 | Struger et al. | 395/650 |
| 5,098,197 A | 3/1992 | Shepard et al. | 374/120 |
| 5,099,436 A | 3/1992 | McCown et al. | 364/550 |
| 5,103,409 A | 4/1992 | Shimizu et al. | 364/556 |
| 5,111,531 A | 5/1992 | Grayson et al. | 395/23 |
| 5,121,467 A | 6/1992 | Skeirik | 395/11 |
| 5,122,794 A | 6/1992 | Warrior | 340/825.2 |
| 5,122,976 A | 6/1992 | Bellows et al. | 364/550 |
| 5,130,936 A | 7/1992 | Sheppard et al. | 364/551.01 |
| 5,134,574 A | 7/1992 | Beaverstock et al. | 364/551.01 |
| 5,137,370 A | 8/1992 | McCullock et al. | 374/173 |
| 5,142,612 A | 8/1992 | Skeirik | 395/11 |
| 5,143,452 A | 9/1992 | Maxedon et al. | 374/170 |
| 5,148,378 A | 9/1992 | Shibayama et al. | 364/551.07 |
| 5,150,289 A | 9/1992 | Badavas | 364/154 |
| 5,167,009 A | 11/1992 | Skeirik | 395/27 |
| 5,175,678 A | 12/1992 | Frerichs et al. | 364/148 |
| 5,193,143 A | 3/1993 | Kaemmerer et al. | 395/51 |
| 5,197,114 A | 3/1993 | Skeirik | 395/27 |
| 5,197,328 A | 3/1993 | Fitzgerald | 73/168 |
| 5,212,765 A | 5/1993 | Skeirik | 395/11 |
| 5,214,582 A | 5/1993 | Gray | 364/424.03 |
| 5,216,226 A | 6/1993 | Miyoshi | 219/497 |
| 5,224,203 A | 6/1993 | Skeirik | 395/22 |
| 5,228,780 A | 7/1993 | Shepard et al. | 374/175 |
| 5,235,527 A | 8/1993 | Ogawa et al. | 364/571.05 |
| 5,265,031 A | 11/1993 | Malczewski | 364/497 |
| 5,265,222 A | 11/1993 | Nishiya et al. | 395/3 |
| 5,269,311 A | 12/1993 | Kirchner et al. | 128/672 |
| 5,274,572 A | 12/1993 | O'Neill et al. | 364/550 |
| 5,282,131 A | 1/1994 | Rudd et al. | 364/164 |
| 5,282,261 A | 1/1994 | Skeirik | 395/22 |
| 5,293,585 A | 3/1994 | Morita | 395/52 |
| 5,303,181 A | 4/1994 | Stockton | 365/96 |
| 5,305,230 A | 4/1994 | Matsumoto et al. | 364/495 |
| 5,311,421 A | 5/1994 | Nomura et al. | 364/157 |
| 5,317,520 A | 5/1994 | Castle | 364/482 |
| 5,327,357 A | 7/1994 | Feinstein et al. | 364/502 |
| 5,333,240 A | 7/1994 | Matsumoto et al. | 395/23 |
| 5,340,271 A | 8/1994 | Freeman et al. | 415/1 |
| 5,347,843 A | 9/1994 | Orr et al. | 73/3 |
| 5,349,541 A | 9/1994 | Alexandro, Jr. et al. | 364/578 |
| 5,357,449 A | 10/1994 | Oh | 364/551.01 |
| 5,361,628 A | 11/1994 | Marko et al. | 73/116 |
| 5,365,423 A | 11/1994 | Chand | 364/140 |
| 5,365,787 A | 11/1994 | Hernandez et al. | 73/660 |
| 5,367,612 A | 11/1994 | Bozich et al. | 395/22 |
| 5,369,674 A | 11/1994 | Yokose et al. | 376/245 |
| 5,372,041 A | 12/1994 | Yoshida et al. | 73/514.31 |
| 5,384,699 A | 1/1995 | Levy et al. | 364/413.13 |
| 5,386,373 A | 1/1995 | Keeler et al. | 364/577 |
| 5,388,465 A | 2/1995 | Okaniwa et al. | 73/861.17 |
| 5,392,293 A | 2/1995 | Hsue | 324/765 |
| 5,394,341 A | 2/1995 | Kepner | 364/551.01 |
| 5,394,543 A | 2/1995 | Hill et al. | 395/575 |
| 5,404,064 A | 4/1995 | Mermelstein et al. | 310/319 |
| 5,408,406 A | 4/1995 | Mathur et al. | 364/163 |
| 5,408,586 A | 4/1995 | Skeirik | 395/23 |
| 5,410,494 A | 4/1995 | Ramamurthi | 364/511.05 |
| 5,414,645 A | 5/1995 | Hirano | 364/551.01 |
| 5,419,197 A | 5/1995 | Ogi et al. | 73/659 |
| 5,430,642 A | 7/1995 | Nakajima et al. | 364/148 |
| 5,434,774 A | 7/1995 | Seberger | 364/172 |
| 5,436,705 A | 7/1995 | Raj | 355/246 |
| 5,440,478 A | 8/1995 | Fisher et al. | 364/188 |
| 5,442,639 A | 8/1995 | Crowder et al. | 371/20.1 |
| 5,467,355 A | 11/1995 | Umeda et al. | 364/571.04 |
| 5,469,070 A | 11/1995 | Koluvek | 324/713 |
| 5,469,156 A | 11/1995 | Kogura | 340/870.38 |
| 5,469,735 A | 11/1995 | Watanabe | 73/118.1 |
| 5,469,749 A | 11/1995 | Shimada et al. | 73/861.47 |
| 5,471,884 A | 12/1995 | Czarnocki et al. | 73/720 |
| 5,481,199 A | 1/1996 | Anderson et al. | 324/705 |
| 5,481,200 A | 1/1996 | Voegele et al. | 324/718 |
| 5,483,387 A | 1/1996 | Bauhahn et al. | 359/885 |
| 5,485,753 A | 1/1996 | Burns et al. | 73/720 |
| 5,486,996 A | 1/1996 | Samad et al. | 364/152 |
| 5,488,697 A | 1/1996 | Kaemmerer et al. | 395/51 |
| 5,489,831 A | 2/1996 | Harris | 318/701 |
| 5,495,769 A | 3/1996 | Broden et al. | 73/718 |

| Patent No. | Date | Inventor | Class |
|---|---|---|---|
| 5,497,661 A | 3/1996 | Stripf et al. | 73/611 |
| 5,510,779 A | 4/1996 | Maltby et al. | 340/870.3 |
| 5,511,004 A | 4/1996 | Dubost et al. | 364/551.01 |
| 5,526,293 A | 6/1996 | Mozumder et al. | 364/578 |
| 5,537,335 A | 7/1996 | Antaki et al. | 28/271 |
| 5,539,638 A | 7/1996 | Keeler et al. | 364/424.03 |
| 5,548,528 A | 8/1996 | Keeler et al. | 364/497 |
| 5,555,190 A | 9/1996 | Derby et al. | 364/510 |
| 5,560,246 A | 10/1996 | Bottinger et al. | 73/861.15 |
| 5,561,599 A | 10/1996 | Lu | 364/164 |
| 5,570,034 A | 10/1996 | Needham et al. | 324/763 |
| 5,570,300 A | 10/1996 | Henry et al. | 364/551.01 |
| 5,572,420 A | 11/1996 | Lu | 364/153 |
| 5,573,032 A | 11/1996 | Lenz et al. | 137/486 |
| 5,578,763 A | 11/1996 | Spencer et al. | 73/861.08 |
| 5,591,922 A | 1/1997 | Segeral et al. | 73/861.04 |
| 5,598,521 A | 1/1997 | Kilgore et al. | 395/326 |
| 5,600,148 A | 2/1997 | Cole et al. | 250/495.1 |
| 5,608,650 A | 3/1997 | McClendon et al. | 364/510 |
| 5,623,605 A | 4/1997 | Keshav et al. | 395/200.17 |
| 5,629,870 A | 5/1997 | Farag et al. | 364/551.01 |
| 5,633,809 A | 5/1997 | Wissenbach et al. | 364/510 |
| 5,637,802 A | 6/1997 | Frick et al. | 73/724 |
| 5,640,491 A | 6/1997 | Bhat et al. | 395/22 |
| 5,644,240 A | 7/1997 | Brugger | 324/439 |
| 5,650,943 A | 7/1997 | Powell et al. | 364/550 |
| 5,654,869 A | 8/1997 | Ohi et al. | 361/540 |
| 5,661,668 A | 8/1997 | Yemini et al. | 364/550 |
| 5,665,899 A | 9/1997 | Willcox | 73/1.63 |
| 5,669,713 A | 9/1997 | Schwartz et al. | 374/183 |
| 5,671,335 A | 9/1997 | Davis et al. | 395/23 |
| 5,672,247 A | 9/1997 | Pangalos et al. | 162/65 |
| 5,675,504 A | 10/1997 | Serodes et al. | 364/496 |
| 5,675,724 A | 10/1997 | Beal et al. | 395/182.02 |
| 5,680,109 A | 10/1997 | Lowe et al. | 340/608 |
| 5,682,317 A | 10/1997 | Keeler et al. | 364/431.03 |
| 5,700,090 A | 12/1997 | Eryurek | 374/210 |
| 5,703,575 A | 12/1997 | Kirpatrick | 340/870.17 |
| 5,704,011 A | 12/1997 | Hansen et al. | 395/22 |
| 5,705,754 A | 1/1998 | Keita et al. | 73/861.357 |
| 5,705,978 A | 1/1998 | Frick et al. | 340/511 |
| 5,708,211 A | 1/1998 | Jepson et al. | 73/861.04 |
| 5,708,585 A | 1/1998 | Kushion | 364/431.061 |
| 5,710,370 A | 1/1998 | Shanahan et al. | 73/1.35 |
| 5,710,708 A | 1/1998 | Wiegand | 364/430.1 |
| 5,713,668 A | 2/1998 | Lunghofer et al. | 374/179 |
| 5,719,378 A | 2/1998 | Jackson, Jr. et al. | 219/497 |
| 5,731,522 A | 3/1998 | Sittler | 73/708 |
| 5,736,649 A | 4/1998 | Kawasaki et al. | 73/861.23 |
| 5,736,653 A | 4/1998 | Drahm et al. | 73/861.356 |
| 5,741,074 A | 4/1998 | Wang et al. | 374/185 |
| 5,742,845 A | 4/1998 | Wagner | 395/831 |
| 5,746,511 A | 5/1998 | Eryurek et al. | 374/2 |
| 5,747,701 A | 5/1998 | Marsh et al. | 73/861.23 |
| 5,752,008 A | 5/1998 | Bowling | 395/500 |
| 5,756,898 A | 5/1998 | Diatschenko et al. | 73/592 |
| 5,764,539 A | 6/1998 | Rani | 364/557 |
| 5,764,891 A | 6/1998 | Warrior | 395/200.2 |
| 5,781,024 A | 7/1998 | Blomberg et al. | 324/763 |
| 5,781,878 A | 7/1998 | Mizoguchi et al. | 701/109 |
| 5,790,413 A | 8/1998 | Bartusiak et al. | 364/485 |
| 5,796,006 A * | 8/1998 | Bellet et al. | 73/658 |
| 5,801,689 A | 9/1998 | Huntsman | 345/329 |
| 5,805,442 A | 9/1998 | Crater et al. | 364/138 |
| 5,817,950 A | 10/1998 | Wiklund et al. | 73/861.66 |
| 5,825,664 A | 10/1998 | Warrior et al. | 700/7 |
| 5,828,567 A | 10/1998 | Eryurek et al. | 700/79 |
| 5,829,876 A | 11/1998 | Schwartz et al. | 374/1 |
| 5,848,383 A | 12/1998 | Yuuns | 702/102 |
| 5,854,993 A | 12/1998 | Crichnik | 702/54 |
| 5,854,994 A | 12/1998 | Canada et al. | 702/56 |
| 5,859,964 A | 1/1999 | Wang et al. | 395/185.01 |
| 5,869,772 A | 2/1999 | Storer | 73/861.24 |
| 5,874,676 A | 2/1999 | Maki, Jr. | 73/579 |
| 5,876,122 A | 3/1999 | Eryurek | 374/183 |
| 5,880,376 A | 3/1999 | Sai et al. | 73/861.08 |
| 5,887,978 A | 3/1999 | Lunghofer et al. | 374/179 |
| 5,908,990 A | 6/1999 | Cummings | 73/861.22 |
| 5,912,499 A | 6/1999 | Diem et al. | 257/419 |
| 5,923,557 A | 7/1999 | Eidson | 364/471.03 |
| 5,924,086 A | 7/1999 | Mathur et al. | 706/25 |
| 5,926,778 A | 7/1999 | Pöppel | 702/130 |
| 5,934,371 A | 8/1999 | Bussear et al. | 166/53 |
| 5,936,514 A | 8/1999 | Anderson et al. | 340/310.01 |
| 5,940,290 A | 8/1999 | Dixon | 364/138 |
| 5,956,663 A | 9/1999 | Eryurek et al. | 702/183 |
| 5,970,430 A | 10/1999 | Burns et al. | 702/122 |
| 5,995,910 A | 11/1999 | Discenzo | 702/56 |
| 6,002,952 A | 12/1999 | Diab et al. | 600/310 |
| 6,006,338 A | 12/1999 | Longsdorf et al. | 713/340 |
| 6,014,612 A | 1/2000 | Larson et al. | 702/183 |
| 6,014,902 A | 1/2000 | Lewis et al. | 73/861.12 |
| 6,016,523 A | 1/2000 | Zimmerman et al. | 710/63 |
| 6,016,706 A | 1/2000 | Yamamoto et al. | 9/6 |
| 6,017,143 A * | 1/2000 | Eryurek et al. | 706/23 |
| 6,023,399 A | 2/2000 | Kogure | 361/23 |
| 6,026,352 A | 2/2000 | Burns et al. | 702/182 |
| 6,038,579 A | 3/2000 | Sekine | 708/400 |
| 6,045,260 A | 4/2000 | Schwartz et al. | 374/183 |
| 6,046,642 A | 4/2000 | Brayton et al. | 330/296 |
| 6,047,220 A | 4/2000 | Eryurek et al. | 700/28 |
| 6,047,222 A | 4/2000 | Burns et al. | 700/79 |
| 6,052,655 A | 4/2000 | Kobayashi et al. | 702/184 |
| 6,061,603 A | 5/2000 | Papadopoulos et al. | 700/83 |
| 6,069,560 A | 5/2000 | Larsson | 340/540 |
| 6,072,150 A | 6/2000 | Sheffer | 219/121.83 |
| 6,094,600 A | 7/2000 | Sharpe, Jr. et al. | 700/19 |
| 6,112,131 A | 8/2000 | Ghorashi et al. | 700/142 |
| 6,119,047 A | 9/2000 | Eryurek et al. | 700/28 |
| 6,119,529 A | 9/2000 | Di Marco et al. | 73/861.68 |
| 6,139,180 A | 10/2000 | Usher et al. | 374/1 |
| 6,151,560 A | 11/2000 | Jones | 702/58 |
| 6,179,964 B1 | 1/2001 | Begemann et al. | 162/198 |
| 6,182,501 B1 | 2/2001 | Furuse et al. | 73/49.2 |
| 6,192,281 B1 | 2/2001 | Brown et al. | 700/2 |
| 6,195,591 B1 | 2/2001 | Nixon et al. | 700/2 |
| 6,199,018 B1 | 3/2001 | Quist et al. | 702/34 |
| 6,209,048 B1 | 3/2001 | Wolff | 710/62 |
| 6,236,948 B1 | 5/2001 | Eck et al. | 702/45 |
| 6,237,424 B1 | 5/2001 | Salmasi et al. | 73/861.17 |
| 6,260,004 B1 | 7/2001 | Hays et al. | 702/183 |
| 6,263,487 B1 | 7/2001 | Stripf et al. | 717/1 |
| 6,272,438 B1 | 8/2001 | Cunningham et al. | 702/56 |
| 6,289,735 B1 | 9/2001 | Dister et al. | 73/579 |
| 6,298,377 B1 | 10/2001 | Hartikainen et al. | 709/223 |
| 6,307,483 B1 | 10/2001 | Westfield et al. | 340/870.11 |
| 6,311,136 B1 | 10/2001 | Henry et al. | 702/45 |
| 6,317,701 B1 | 11/2001 | Pyostsia et al. | 702/188 |
| 6,327,914 B1 | 12/2001 | Dutton | 73/861.356 |
| 6,347,252 B1 | 2/2002 | Behr et al. | 700/2 |
| 6,356,191 B1 | 3/2002 | Kirkpatrick et al. | 340/501 |
| 6,360,277 B1 | 3/2002 | Ruckley et al. | 9/250 |
| 6,367,328 B1 | 4/2002 | Gorman et al. | 73/592 |
| 6,370,448 B1 | 4/2002 | Eryurek et al. | 700/282 |
| 6,377,859 B1 | 4/2002 | Brown et al. | 700/79 |
| 6,378,364 B1 | 4/2002 | Pelletier et al. | 73/152.47 |
| 6,396,426 B1 | 5/2002 | Balard et al. | 341/120 |
| 6,397,114 B1 | 5/2002 | Eryurek et al. | 700/51 |
| 6,405,099 B1 | 6/2002 | Nagai et al. | 700/159 |
| 6,425,038 B1 | 7/2002 | Sprecher | 710/269 |
| 6,434,504 B1 | 8/2002 | Eryurek et al. | 702/130 |
| 6,449,574 B1 | 9/2002 | Eryurek et al. | 702/99 |
| 6,473,656 B1 | 10/2002 | Langels et al. | 700/17 |
| 6,473,710 B1 | 10/2002 | Eryurek | 702/133 |
| 6,480,793 B1 | 11/2002 | Martin | 702/45 |
| 6,492,921 B1 | 12/2002 | Kunitani et al. | 341/118 |

| | | | | | | |
|---|---|---|---|---|---|---|
| 6,493,689 B2 * | 12/2002 | Kotoulas et al. ............... 706/23 | EP | 0 122 622 | A1 | 10/1984 |
| 6,497,222 B2 | 12/2002 | Bolz et al. .................. 123/476 | EP | 0 413 814 | A1 | 2/1991 |
| 6,505,517 B1 | 1/2003 | Eryurek et al. ........... 73/861.08 | EP | 0 487 419 | A2 | 5/1992 |
| 6,519,546 B1 | 2/2003 | Eryurek et al. .............. 702/130 | EP | 0 512 794 | A2 | 11/1992 |
| 6,532,392 B1 | 3/2003 | Eryurek et al. ................ 700/54 | EP | 0 594 227 | A1 | 4/1994 |
| 6,539,267 B1 | 3/2003 | Eryurek et al. ................ 700/51 | EP | 0 624 847 | A1 | 11/1994 |
| 6,546,814 B1 | 4/2003 | Choe et al. ............... 73/862.08 | EP | 0 644 470 | A2 | 3/1995 |
| 6,556,145 B1 | 4/2003 | Kirkpatrick et al. .... 340/870.17 | EP | 0 754 934 | A1 | 7/1995 |
| 6,567,006 B1 | 5/2003 | Lander et al. ............... 340/605 | EP | 0 697 586 | A2 | 2/1996 |
| 6,584,847 B1 | 7/2003 | Hirose ........................ 73/579 | EP | 0 749 057 | A1 | 12/1996 |
| 6,591,226 B1 | 7/2003 | Hartmann et al. ........... 702/183 | EP | 0 825 506 | A2 | 7/1997 |
| 6,594,603 B1 | 7/2003 | Eryurek et al. .............. 702/104 | EP | 0 827 096 | A2 | 9/1997 |
| 6,597,997 B2 | 7/2003 | Tingley ....................... 702/34 | EP | 0 838 768 | A2 | 9/1997 |
| 6,601,005 B1 | 7/2003 | Eryurek et al. .............. 702/104 | EP | 0 807 804 | A2 | 11/1997 |
| 6,611,775 B1 | 8/2003 | Coursolle et al. ............. 702/65 | EP | 1 058 093 | A1 | 5/1999 |
| 6,615,149 B1 | 9/2003 | Wehrs ........................ 702/76 | EP | 0 335 957 | B1 | 11/1999 |
| 6,654,697 B1 | 11/2003 | Eryurek et al. ................ 702/47 | EP | 1 022 626 | A2 | 7/2000 |
| 6,662,120 B2 * | 12/2003 | Drahm et al. .......... 73/861.355 | FR | 2 302 514 | | 9/1976 |
| 6,727,812 B2 | 4/2004 | Sauler et al. ................ 340/511 | FR | 2 334 827 | | 7/1977 |
| 6,751,560 B1 | 6/2004 | Tingley et al. ................ 702/51 | GB | 928704 | | 6/1963 |
| 6,758,168 B2 | 7/2004 | Koskinen et al. ............... 122/7 | GB | 1 534 280 | | 11/1978 |
| 6,904,476 B2 | 6/2005 | Hedtke ........................ 710/72 | GB | 1 534 288 | | 11/1978 |
| 6,915,364 B1 | 7/2005 | Christensen et al. ......... 710/104 | GB | 2 310 346 | A | 8/1997 |
| 6,920,789 B2 | 7/2005 | Sakai ......................... 73/587 | GB | 2 317 969 | | 4/1998 |
| 7,010,459 B2 | 3/2006 | Eryurek et al. .............. 702/182 | GB | 2 342 453 | A | 4/2000 |
| 7,040,179 B2 | 5/2006 | Drahm et al. .......... 73/861.356 | GB | 2 347 232 | A | 8/2000 |
| 7,058,542 B2 | 6/2006 | Hauhia et al. ............... 702/183 | JP | 56031573 | | 3/1981 |
| 7,099,852 B2 | 8/2006 | Unsworth et al. .............. 706/23 | JP | 57196619 | | 2/1982 |
| 7,137,307 B2 | 11/2006 | Huybrechts et al. ...... 73/861.12 | JP | 58-129316 | | 8/1983 |
| 7,171,281 B2 | 1/2007 | Weber et al. .................. 700/96 | JP | 59-116811 | | 7/1984 |
| 7,254,518 B2 | 8/2007 | Eryurek et al. .............. 702/183 | JP | 59-163520 | | 9/1984 |
| 7,258,024 B2 | 8/2007 | Dimarco et al. .......... 73/861.22 | JP | 59176643 | | 10/1984 |
| 7,290,450 B2 | 11/2007 | Brown et al. .................. 73/579 | JP | 59-211196 | | 11/1984 |
| 7,321,846 B1 | 1/2008 | Huisenga et al. ............. 702/183 | JP | 59-211896 | | 11/1984 |
| 2002/0013629 A1 | 1/2002 | Nixon et al. | JP | 60-000507 | | 1/1985 |
| 2002/0032544 A1 | 3/2002 | Reid et al. .................. 702/183 | JP | 60-76619 | | 5/1985 |
| 2002/0077711 A1 | 6/2002 | Nixon et al. ................. 700/19 | JP | 60-131495 | | 7/1985 |
| 2002/0078752 A1 | 6/2002 | Braunling et al. ............. 73/627 | JP | 60-174915 | | 9/1985 |
| 2002/0095986 A1 | 7/2002 | Ito et al. ..................... 73/168 | JP | 62-30915 | | 2/1987 |
| 2002/0121910 A1 | 9/2002 | Rome et al. ................. 324/718 | JP | 62-080535 | | 4/1987 |
| 2002/0145568 A1 | 10/2002 | Winter ....................... 343/701 | JP | 62-50901 | | 9/1987 |
| 2002/0148644 A1 | 10/2002 | Schultz et al. ................ 175/39 | JP | 63-169532 | | 7/1988 |
| 2002/0194547 A1 | 12/2002 | Christensen et al. .......... 714/43 | JP | 64-01914 | | 1/1989 |
| 2003/0033040 A1 | 2/2003 | Billings ........................ 700/67 | JP | 64-72699 | | 3/1989 |
| 2003/0045962 A1 | 3/2003 | Eryurek et al. .............. 700/128 | JP | 11-87430 | | 7/1989 |
| 2004/0025593 A1 | 2/2004 | Hashimoto et al. ............ 73/643 | JP | 2-05105 | | 1/1990 |
| 2004/0093174 A1 | 5/2004 | Lander ........................ 702/56 | JP | 03118424 | | 5/1991 |
| 2004/0128034 A1 | 7/2004 | Lenker et al. ............... 700/282 | JP | 3-229124 | | 10/1991 |
| 2004/0249583 A1 | 12/2004 | Eryurek et al. ................ 702/47 | JP | 4-70906 | | 3/1992 |
| 2005/0072239 A1 | 4/2005 | Longsdorf et al. ............. 73/649 | JP | 5-122768 | | 5/1993 |
| 2006/0075009 A1 | 4/2006 | Lenz et al. .................. 708/160 | JP | 6-95882 | | 4/1994 |
| 2006/0277000 A1 | 12/2006 | Wehrs ....................... 702/183 | JP | 06242192 | | 9/1994 |
| 2007/0010968 A1 | 1/2007 | Longsdorf et al. ........... 702/183 | JP | 06-248224 | | 10/1994 |
| | | | JP | 7-063586 | | 3/1995 |
| | FOREIGN PATENT DOCUMENTS | | JP | 07234988 | | 9/1995 |
| CN | 1185841 | 6/1998 | JP | 8-054923 | | 2/1996 |
| DE | 32 13 866 A1 | 10/1983 | JP | 8-102241 | | 4/1996 |
| DE | 3503597 | 7/1986 | JP | 08-114638 | | 5/1996 |
| DE | 35 40 204 C1 | 9/1986 | JP | 8-136386 | | 5/1996 |
| DE | 40 08 560 A1 | 9/1990 | JP | 8-166309 | | 6/1996 |
| DE | 43 43 747 | 6/1994 | JP | 8-247076 | | 9/1996 |
| DE | 44 33 593 A1 | 6/1995 | JP | 8-313466 | | 11/1996 |
| DE | 195 02 499 A1 | 8/1996 | JP | 2712625 | | 10/1997 |
| DE | 296 00 609 U1 | 3/1997 | JP | 2712701 | | 10/1997 |
| DE | 197 04 694 A1 | 8/1997 | JP | 2753592 | | 3/1998 |
| DE | 19930660 A1 | 7/1999 | JP | 07225530 | | 5/1998 |
| DE | 199 05 071 | 8/2000 | JP | 10-232170 | | 9/1998 |
| DE | 19905071 A1 | 8/2000 | JP | 11-083575 | | 3/1999 |
| DE | 299 17 651 U1 | 12/2000 | WO | WO94/25933 | | 11/1994 |
| DE | 19947129 | 4/2001 | WO | WO 95/23361 | | 8/1995 |
| DE | 100 36 971 A1 | 2/2002 | WO | WO96/11389 | | 4/1996 |
| DE | 102 23 725 A1 | 4/2003 | WO | WO96/12993 | | 5/1996 |
| | | | WO | WO96/39617 | | 12/1996 |

| WO | WO97/21157 | 6/1997 |
| WO | WO97/25603 | 7/1997 |
| WO | WO98/06024 | 2/1998 |
| WO | WO98/13677 | 4/1998 |
| WO | WO98/14855 | 4/1998 |
| WO | WO98/20469 | 5/1998 |
| WO | WO98/39718 | 9/1998 |
| WO | WO99/19782 | 4/1999 |
| WO | WO 00/41050 | 7/2000 |
| WO | WO 00/55700 | 9/2000 |
| WO | WO 00/70531 | 11/2000 |
| WO | WO 01/01213 | 1/2001 |
| WO | WO 01/01213 A1 | 1/2001 |
| WO | WO 01/19440 A1 | 3/2001 |
| WO | WO 01/77766 | 10/2001 |
| WO | WO 01/90704 A2 | 11/2001 |
| WO | WO 02/27418 | 4/2002 |
| WO | WO 02/059497 A2 | 8/2002 |
| WO | WO 03/081002 A1 | 10/2003 |

OTHER PUBLICATIONS

"Notification of Transmittal of The International Search Report or the Declaration", PCT/US2004/025291.
"Invitation to Pay Additional Fees and Annex to Form PCT/ISA/206".
"Notification of Transmittal of The International Search Report or the Declaration", PCT/US2004/017300.
U.S. Appl. No. 10/893,144, filed Jul. 2004, Brown et al.
U.S. Appl. No. 09/257,896, filed Feb. 25, 1999, Eryurek et al.
U.S. Appl. No. 09/384,876, filed Aug. 27, 1999 Eryurek et al.
U.S. Appl. No. 09/409,098, filed Sep. 30, 1999, Eryurek et al.
U.S. Appl. No. 09/799,824, filed Mar. 5, 2001, Rome et al.
U.S. Appl. No. 09/855,179, filed May 14, 2001, Eryurek et al.
U.S. Appl. No. 09/852,102, filed May 9, 2001, Eryurek et al.
U.S. Appl. No. 09/943,333, filed Aug. 30, 2001, Eryurek et al.
U.S. Appl. No. 09/972,078, filed Oct. 5, 2001, Eryurek et al.
U.S. Appl. No. 10/635,944, filed Aug. 7, 2003, Huisenga et al.
"A TCP\IP Tutorial" by, Socolofsky et al., Spider Systems Limited, Jan. 1991 pp. 1-23.
"Approval Standards For Explosionproof Electrical Equipment General Requirements", Factory Mutual Research, C1. No. 3615, Mar. 1989, pp. 1-34.
"Approval Standard Intrinsically Safe Apparatus and Associated For Use In Class I, II, and III, Division 1 Hazardous (Classified) Locations", Factory Mutual Research, C1. No. 3610, Oct. 1988, pp. 1-70.
"Automation On-line" by, Phillips et al., Plant Services, Jul. 1997, pp. 41-45.
"Climb to New Heights by Controlling your PLCs Over the Internet" by, Phillips et al., Intech, Aug. 1998, pp. 50-51.
"CompProcessor For Piezoresistive Sensors" MCA Technologies Inc. (MCA7707), pp. 1-8.
"Ethernet emerges as viable, inexpensive fieldbus", Paul G. Schreier, Personal Engineering, Dec. 1997, p. 23-29.
"Ethernet Rules Closed-loop System" by, Eidson et al., Intech, Jun. 1998, pp. 39-42.
"Fieldbus Standard for Use in Industrial Control Systems Part 2: Physical Layer Specification and Service Definition", ISA-S50.02-1992, pp. 1-93.
"Fieldbus Standard for Use in Industrial Control Systems Part 3: Data Link Service Definition", ISA-S50.02-1997, Part 3, Aug. 1997, pp. 1-159.
Fieldbus Standard For Use in Industrial Control Systems Part 4: Data Link Protocol Specification, ISA-S50.02-1997, Part 4, Aug. 1997, pp. 1-148.
"Fieldbus Support For Process Analysis" by, Blevins et al., Fisher-Rosemount Systems, Inc., 1995, pp. 121-128.
"Fieldbus Technical Overview Understanding FOUNDATION™ fieldbus technology", Fisher-Rosemount, 1998, pp. 1-23.
"Hypertext Transfer Protocol—HTTP/1.0" by, Berners-Lee et al., MIT/LCS, May 1996, pp. 1-54.
"Infranets, Intranets, and the Internet" by, Pradip Madan, Echelon Corp, Sensors, Mar. 1997, pp. 46-50.
"Internet Technology Adoption into Automation" by, Fondl et al., Automation Business, pp. 1-5.
"Internet Protocol Darpa Internet Program Protocol Specification" by, Information Sciences Institute, University of Southern California, RFC 791, Sep. 1981, pp. 1-43.
"Introduction to Emit", emWare, Inc., 1997, pp. 1-22.
"Introduction to the Internet Protocols" by, Charles L. Hedrick, Computer Science Facilities Group, Rutgers University, Oct. 3, 1988, pp. 1-97.
"Is There A Future For Ethernet in Industrial Control?", Miclot et al., Plant Engineering, Oct. 1988, pp. 44-46, 48, 50.
LFM/SIMA Internet Remote Diagnostics Research Project Summary Report, Stanford University, Jan. 23, 1997, pp. 1-6.
"Managing Devices with the Web" by, Howard et al., Byte, Sep. 1997, pp. 45-64.
"Modular Microkernel Links GUI And Browser For Embedded Web Devices" by, Tom Williams, pp. 1-2.
"PC Software Gets Its Edge From Windows, Components, and the Internet", Wayne Labs, I&CS, Mar. 1997, pp. 23-32.
Proceedings Sensor Expo, Anaheim, California, Produced by Expocon Management Associates, Inc., Apr. 1996, pp. 9-21.
Proceedings Sensor Expo, Boston, Massachuttes, Produced by Expocon Management Associates, Inc., May 1997, pp. 1-416.
"Smart Sensor Network of the Future" by, Jay Warrior, Sensors, Mar. 1997, pp. 40-45.
"The Embedded Web Site" by, John R. Hines, IEEE Spectrum, Sep. 1996, p. 23.
"Transmission Control Protocol: Darpa Internet Program Protocol Specification" Information Sciences Institute, Sep. 1981, pp. 1-69.
"On-Line Statistical Process Control for a Glass Tank Ingredient Scale," by R.A. Weisman, *IFAC real Time Programming*, 1985, pp. 29-38.
"The Performance of Control Charts for Monitoring Process Variation," by C. Lowry et al., *COMMUN. STATIS.—SIMULA.*, 1995, pp. 409-437.
"A Knowledge-Based Approach for Detection and Diagnosis of Out-Of-Control Events in Manufacturing Processes," by P. Love et al., *IEEE*, 1989, pp. 736-741.
"Advanced Engine Diagnostics Using Universal Process Modeling", by P. O'Sullivan, *Presented at the 1996 SAE Conference on Future Transportation Technology*, pp. 1-9.
Parallel, Fault-Tolerant Control and Diagnostics System for Feedwater Regulation in PWRS, by E. Eryurek et al., *Proceedings of the American Power Conference*.
"Programmable Hardware Architectures for Sensor Validation", by M.P. Henry et al., *Control Eng. Practice*, vol. 4, No. 10., pp. 1339-1354, (1996).
"Sensor Validation for Power Plants Using Adaptive Backpropagation Neural Network," *IEEE Transactions on Nuclear Science*, vol. 37, No. 2, by E. Eryurek et al. Apr. 1990, pp. 1040-1047.
"Signal Processing, Data Handling and Communications: The Case for Measurement Validation", by M.P. Henry, *Department of Engineering Science*, Oxford University.
"Smart Temperature Measurement in the '90s", by T. Kerlin et al., *C&I*, (1990).
"Software-Based Fault-Tolerant Control Design for Improved Power Plant Operation," *IEEE/IFAC Joint Symposium on Computer-Aided Control System Design*, Mar. 7-9, 1994 pp. 585-590.
A Standard Interface for Self-Validating Sensors, by M.P. Henry et al., *Report No. QUEL 1884/91*, (1991).
"Taking Full Advantage of Smart Transmitter Technology Now," by G. Orrison, *Control Engineering*, vol. 42, No. 1, Jan. 1995.
"Using Artificial Neural Networks to Identify Nuclear Power Plant States," by Israel E. Alguindigue et al., pp. 1-4.
"Application of Neural Computing Paradigms for Signal Validation," by B.R. Upadhyaya et al., *Department of Nuclear Engineering*, pp. 1-18.
"Application of Neural Networks for Sensor Validation and Plant Monitoring," by B. Upadhyaya et al., *Nuclear Technology*, vol. 97, No. 2, Feb. 1992 pp. 170-176.
"Automated Generation of Nonlinear System Characterization for Sensor Failure Detection," by B.R. Upadhyaya et al., *ISA*, 1989 pp. 269-274.

"In Situ Calibration of Nuclear Plant Platinum Resistance Thermometers Using Johnson Noise Methods," *EPRI*, Jun. 1983.

"Johnson Noise Thermometer for High Radiation and High-Temperature Environments," by L. Oakes et al., *Fifth Symposium on Space Nuclear Power Systems*, Jan. 1988, pp. 2-23.

"Development of a Resistance Thermometer For Use Up to 1600° C", by M.J. de Groot et al., *CAL LAB*, Jul./Aug. 1996, pp. 38-41.

"Survey, Applications, And Prospects of Johnson Noise Thermometry," by T. Blalock et al., *Electrical Engineering Department*, 1981 pp. 2-11.

"Noise Thermometry for Industrial and Metrological Applications at KFA Julich," by H. Brixy et al., *7th International Symposium on Temperature*, 1992.

"Johnson Noise Power Thermometer and its Application in Process Temperature Measurement," by T.V. Blalock et al., *American Institute of Physics* 1982, pp. 1249-1259.

"Field-based Architecture is Based on Open Systems, Improves Plant Performance", by P. Cleaveland, *I&Cs*, Aug. 1996, pp. 73-74.

"Tuned-Circuit Dual-Mode Johnson Noise Thermometers," by R.L. Shepard et al., Apr. 1992.

"Tuned-Circuit Johnson Noise Thermometry," by Michael Roberts et al., *7th Symposium on Space Nuclear Power Systems*, Jan. 1990.

"Smart Field Devices Provide New Process Data, Increase System Flexibility," by Mark Boland, *I&CS*, Nov. 1994, pp. 45-51.

"Wavelet Analysis of Vibration, Part I: Theory[1]," by D.E. Newland, *Journal of Vibration and Acoustics*, vol. 116, Oct. 1994, pp. 409-416.

"Wavelet Analysis of Vibration, Part 2: Wavelet Maps," by D.E. Newland, *Journal of Vibration and Acoustics*, vol. 116, Oct. 1994, pp. 417-425.

"Development of a Long-Life, High-Reliability Remotely Operated Johnson Noise Thermometer," by R.L. Shepard et al., *ISA*, 1991, pp. 77-84.

"Application of Johnson Noise Thermometry to Space Nuclear Reactors," by M.J. Roberts et al., *Presented at the 6th Symposium on Space Nuclear Power Systems*, Jan. 9-12, 1989.

"A Decade of Progress in High Temperature Johnson Noise Thermometry," by T.V. Blalock et al., *American Institute of Physics*, 1982 pp. 1219-1223.

"Sensor and Device Diagnostics for Predictive and Proactive Maintenance", by B. Boynton, *A Paper Presented at the Electric Power Research Institute—Fossil Plant Maintenance Conference* in Baltimore, Maryland, Jul. 29-Aug. 1, 1996, pp. 50-1—50-6.

"Detection of Hot Spots in Thin Metal Films Using an Ultra Sensitive Dual Channel Noise Measurement System," by G.H. Massiha et al., *Energy and Information Technologies in the Southeast*, vol. 3 of 3, Apr. 1989, pp. 1310-1314.

"Detecting Blockage in Process Connections of Differential Pressure Transmitters", by E. Taya et al., *SICE*, 1995, pp. 1605-1608.

"Development and Application of Neural Network Algorithms For Process Diagnostics," by B.R. Upadhyaya et al., *Proceedings of the 29th Conference on Decision and Control*, 1990, pp. 3277-3282.

"A Fault-Tolerant Interface for Self-Validating Sensors", by M.P. Henry, *Colloquium*, pp. 3/1-3/2 (Nov. 1990).

"Fuzzy Logic and Artificial Neural Networks for Nuclear Power Plant Applications," by R.C. Berkan et al., *Proceedings of the American Power Conference*.

"Fuzzy Logic and Neural Network Applications to Fault Diagnosis", by P. Frank et al., *International Journal of Approximate Reasoning*, (1997), pp. 68-88.

"Keynote Paper: Hardware Compilation-A New Technique for Rapid Prototyping of Digital Systems-Applied to Sensor Validation", by M.P. Henry, *Control Eng. Practice*, vol. 3, No. 7., pp. 907-924, (1995).

"The Implications of Digital Communications on Sensor Validation", by M. Henry et al., *Report No. QUEL 1912/92*, (1992).

"In-Situ Response Time Testing of Thermocouples", *ISA*, by H.M. Hashemian et al., Paper No. 89-0056, pp. 587-593, (1989).

"An Integrated Architecture For Signal Validation in Power Plants," by B.R. Upadhyaya et al., *Third IEEE International Symposium on Intelligent Control*, Aug. 24-26, 1988, pp. 1-6.

"Integration of Signal Validation Modules for Sensor Monitoring," by B. Upadhyaya et al., *Department of Nuclear Engineering*, Jul. 8, 1990, pp. 1-6.

"Intelligent Behaviour for Self-Validating Sensors", by M.P. Henry, *Advances In Measurement*, pp. 1-7, (May 1990).

"Measurement of the Temperature Fluctuation in a Resistor Generating I/F Fluctuation," by S. Hashiguchi, *Japanese Journal of Applied Physics*, vol. 22, No. 5, Part 2, May 1983, pp. L284-L286.

"Check of Semiconductor Thermal Resistance Elements by the Method of Noise Thermometry", by A. B. Kisilevskii et al., *Measurement Techniques*, vol. 25, No. 3, Mar. 1982, New York, USA, pp. 244-246.

"Neural Networks for Sensor Validation and Plant Monitoring," by B. Upadhyaya, *International Fast Reactor Safety Meeting*, Aug. 12-16, 1990, pp. 2-10.

"Neural Networks for Sensor Validation and Plantwide Monitoring," by E. Eryurek, 1992.

"A New Method of Johnson Noise Thermometry", by C.J. Borkowski et al., *Rev. Sci. Instrum.*, vol. 45 No. 2, (Feb. 1974) pp. 151-162.

"Thermocouple Continuity Checker," *IBM Technical Disclosure Bulletin*, vol. 20, No. 5, pp. 1954 (Oct. 1977).

"A Self-Validating Thermocouple," Janice C-Y et al., *IEEE Transactions on Control Systems Technology*, vol. 5, No. 2, pp. 239-253 (Mar. 1997).

*Instrument Engineers' Handbook*, Chapter IV entitled "Temperature Measurements," by T.J. Claggett, pp. 266-333 (1982).

"emWare's Releases EMIT 3.0, Allowing Manufacturers to Internet and Network Enable Devices Royalty Free," 3 pages, PR Newswire (Nov. 4, 1998).

Warrior, J., "The IEEE P1451.1 Object Model Network Independent Interfaces for Sensors and Actuators," pp. 1-14, Rosemount Inc. (1997).

Warrior, J., "The Collision Between the Web and Plant Floor Automation," 6th. WWW Conference Workshop on Embedded Web Technology, Santa Clara, CA (Apr. 7, 1997).

Microsoft Press Computer Dictionary, 3rd Edition, p. 124.

"Internal Statistical Quality Control for Quality Monitoring Instruments", by P. Girling et al., *ISA*, 15 pgs., 1999.

Web Pages from www.triant.com (3 pgs.).

"Statistical Process Control (Practice Guide Series Book)", *Instrument Society of America*, 1995, pp. 1-58 and 169-204.

"Time-Frequency Analysis of Transient Pressure Signals for a Mechanical Heart Valve Cavitation Study," *ASAIO Journal*, by Alex A. Yu et al., vol. 44, No. 5, pp. M475-M479, (Sep.-Oct. 1998).

"Transient Pressure Signals in Mechanical Heart Valve Caviation," by Z.J. Wu et al., pp. M555-M561 (undated).

"Caviation in Pumps, Pipes and Valves," *Process Engineering*, by Dr. Ronald Young, pp. 47 and 49 (Jan. 1990).

"Quantification of Heart Valve Cavitation Based on High Fidelity Pressure Measurements," *Advances in Bioengineering 1994*, by Laura A. Garrison et al., BED-vol. 28, pp. 297-298 (Nov. 6-11, 1994).

"Monitoring and Diagnosis of Cavitation in Pumps and Valves Using the Wigner Distribution," *Hydroaccoustic Facilities, Instrumentation, and Experimental Techniques*, NCA-vol. 10, pp. 31-36 (1991).

"Developing Predictive Models for Cavitation Erosion," *Codes and Standards in A Global Environment*, PVP-vol. 259, pp. 189-192 (1993).

"Self-Diagnosing Intelligent Motors: A Key Enabler for Next Generation Manufacturing System," by Fred M. Discenzo et al., pp. 3/1-3/4 (1999).

"A Microcomputer-Based Instrument for Applications in Platinum Resistance Thermomety," by H. Rosemary Taylor and Hector A. Navarro, Journal of Physics E. Scientific Instrument, vol. 16, No. 11, pp. 1100-1104 (1983).

"Experience in Using Estelle for the Specification and Verification of a Fieldbus Protocol: FIP," by Barretto et al., Computer Networking, pp. 295-304 (1990).

"Computer Simulation of H1 Field Bus Transmission," by Utsumi et al., Advances in Instrumentation and Control, vol. 46, Part 2, pp. 1815-1827 (1991).

"Progress in Fieldbus Developments for Measuring and Control Application," by A. Schwaier, Sensor and Acuators, pp. 115-119 (1991).

"Ein Emulationssystem zur Leistungsanalyse von Feldbussystemen, Teil 1," by R. Hoyer, pp. 335-336 (1991).

"Simulatore Integrato: Controllo su bus di campo," by Barabino et al., Automazione e Strumentazione, pp. 85-91 (Oct. 1993).

"Ein Modulares, verteiltes Diagnose-Expertensystem für die Fehlerdiagnose in lokalen Netzen," by Jürgen M. Schröder, pp. 557-565 (1990).

"Fault Diagnosis of Fieldbus Systems," by Jürgen Quade, pp. 577-581 (Oct. 1992).

"Ziele und Anwendungen von Feldbussystemen," by T. Pfeifer et al., pp. 549-557 (Oct. 1987).

"PROFIBUS Infrastructure Measures," by Tilo Pfeifer et al., pp. 416-419 (Aug. 1991).

"Simulation the Time Behaviour of Fieldbus Systems," by O. Schnelle, pp. 440-442 (1991).

"Modélisation et simulation d'un bus de terrain: FIP," by Song et al, pp. 5-9 (undated).

"Field Bus Networks for Automation Systems Containing Intelligent Functional Unites," by W. Kriesel et al., pp. 486-489 (1987).

"Field Buses for Process Interconnection with Digital Control Systems," Tecnologia, pp. 141-147 (1990).

"Decentralised Systems with Real-Time Field Bus," Netzwerke, Jg. Nr. 3 v. 14.3, 4 pages (1990).

"Process Measurement and Analysis," by Liptak et al., Instrument Engineers' Handbook, Third Edition, pp. 528-530, (1995).

"Improving Dynamic Performance of Temperature Sensors With Fuzzy Control Techniques," by Wang Lei et al., pp. 872-873 (1992).

"Microsoft Press Computer Dictionary" 2nd Edition, 1994, Microsoft Press. p. 156.

Copy of International Search Report from Application No. PCT/US01/40791 with international filing date of May 22, 2001.

Copy of International Search Report from Application No. PCT/US01/40782 with international filing date of May 22, 2001.

Copy of International Search Report from Application No. PCT/02/14560 with international filing date of May 8, 2002.

Copy of International Search Report from Application No. PCT/US02/14934 with international filing date May 8, 2002.

"On-Line Tool Condition Monitoring System With Wavelet Fuzzy Neural Network," by Li Xiaoli et al., pp. 271-276 (1997).

"Optimal Design of the Coils of An Electromagnetic Flow Meter," by Michalski, A et al., IEEE Transactions on Magnetics, vol. 34, Issue 5, Part 1, pp. 2563-2566 (1998).

"Magnetic Fluid Flow Meter for Gases," Popa, N.C., IEEE Transactions on Magnetics, vol. 30, Issue 2, Part 1-2, pp. 936-938 (1993).

"New Approach to A Main Error Estimation for Primary Transducer of Electromagnetic Flow Meter," by Michalski, A., IEEE Instrumentation and Measurement Technology Conference Proceedings, vol. 2, pp. 1093-1097 (1998).

"Additional Information From Flowmeters Via Signal Analysis," by Amadi-Echendu, J.E. et al., IEEE Instrumentation and Measurement Technology Conference Record, vol. 7, pp. 187-193 (1990).

Copy of International Search Report from Application No. PCT/US02/06606 with international filing date of Mar. 5, 2002.

Copy of International Search Report from Application No. PCT/US02/30465 with international filing date of Sep. 25, 2002.

"What is a weighted moving average?", *DAU STAT REFRESHER*, http://cne.gmu.edu/modules/dau/stat/mvags/wma_bdy.html. (1995).

U.S. Appl. No. 10/744,809, filed Dec. 2003, Brown et al.

"Electrical/Electronics", *SENSORS & TRANSDUCERS*, Nov. 2003, p. 23.

Web Pages from IMI-Sensors. com, 5 pgs.

"Notification of Transmittal of the INternational Preliminary Report on Patentability", PCT/US2004/031678.

"Invitation to Pay Additional Fees" PCT/US2004/031678.

"Notification of Transmittal of the International Search Report and the Written Opinion" PCT/US2004/022736.

"Notfication of Transmittal of the International Search Report" PCT/US00/14798.

"Notification of Transmittal of International Search Report and the Written Opinion", PCT/US2006/037535.

Office Action for Application No. 2004/80027451.9; date Nov. 9, 2007; 9 pages.

"Statistics Glossary: Time Series Data", by Easton et al., http://www.stats.gla.ac.uk/steps./glossary/time_series.html, Sep. 1997.

"The Indicators Story", Sustainable Seattle, pp. 55-59, 1998.

"Detecting Regimes in Temperature Time Series", by Clemins et al., *Artificial Neural Networks in Engineering, Proceedings*, pp. 727-732, 2001.

"Re: Digital Filter-Moving Average", The Math Forumn, http://mathforum.org/discuss/sci.math/a/t/177212, Sep. 28, 1998.

"Office Action" from related U.S. Appl. No. 11/439,095.

Office Action from the corresponding Chinese Patent Application Serial No. 200480027451.9, dated May 16, 2008.

Invitation to Pay Additional Fees for PCT/US2007/011428 filed May 11, 2007; 5 pages.

"Communication" from corresponding European Application No. 04785148.0-1239, dated Jun. 16, 2008.

Translation of "Communication" from corresponding European Application No. 04785148.0-1239.

Communication from Indian Patent Office in corresponding Indian Application No. 1088/CHEN/2006, dated Jul. 7, 2008.

Office Action from the corresponding Chinese Patent Application Serial No. 2004800274519, dated May 16, 2008.

Office Action from the corresponding Chinese Patent Application Serial No. 2004800274519, dated Aug. 29, 2008.

\* cited by examiner

PROCESS DEVICE WITH VIBRATION BASED DIAGNOSTICS

BACKGROUND OF THE INVENTION

The present invention relates to diagnostics of equipment used with industrial processes. More specifically, the invention relates to process devices which perform diagnostics.

Process devices are used in industrial process control systems to control, measure or monitor a process. A control device is a process device which is used to control the process and includes pumps, valves, actuators, solenoids, motors, mixers, agitators, breaker, crusher, roller, mill, ball mill, kneader, blender, filter, cyclone, centrifuge, tower, dryer, conveyor, separator, elevator, hoist, heater, cooler or others. A valve controller includes a valve actuator coupled to a valve used to control flow of process fluid. A pump controller includes a motor controller or actuator coupled to a pump. Other process devices include transmitters which may measure physical parameters such as pressure, temperature, flow, etc. Diagnostics of process devices can be used to identify a failed process device or predict an impending failure in the device or another process component.

Vibration of process equipment such as process piping is disruptive to industrial processes and can result in damage to the piping, instrumentation, and other components of the industrial plant. For example, during normal operation of the process, vibration arises through various sources. The vibration is transmitted to the components which are used in the process. Over extended time, these vibrations can cause degradation in the performance of the components and eventual failure of the components.

Sensing vibrations is a known method used to diagnose process devices. A vibration sensor such as an accelerometer placed directly on a process device can be used to sense vibration noise signals generated by the device. Vibrations are isolated and evaluated by identifying those which exceed an amplitude threshold or which have an abnormal frequency which are indicative of an actual or impending failure or reduction of performance. For example, sensors are placed on pump or motor housings, discharge valves, or flanges associated with the process device. Another known diagnostic method is a manual inspection in which an operator listens for abnormal sounds from the control device.

Detecting harmful vibrations can allow damaged process equipment to be replaced prior to its ultimate failure. Similarly, the vibrations can be used to detect aberrations in operation of equipment or to compensate for degradation in components of the equipment. There is an ongoing need for improved diagnostic technology in industrial process control and monitoring for detecting failed components and components which have been degraded or are in the process of failing. One such technique is shown in U.S. Pat. No. 6,601,005, issued Jul. 29, 2003 and entitled PROCESS DEVICE DIAGNOSTICS USING PROCESS VARIABLE SENSOR SIGNAL which is incorporated herein by reference.

SUMMARY OF THE INVENTION

A process device for use in an industrial process control or monitoring system is configured to couple to a process. The apparatus includes a vibration sensor configured to sense vibrations. These vibrations may be received through a process coupling, mounting arrangement or wiring system and provide a sensed vibration signal. Diagnostic circuitry receives the sensed vibration signal and responsively provides diagnostic output related to a condition of the process or process component. A method of diagnostic process operation based upon sensed vibrations is also provided.

DETAILED DESCRIPTION OF THE PREFERRED EMBODIMENTS

The present invention provides a diagnostic technique for detecting a failure or predicting a failure or reduction in performance of a process device or a process component prior to the occurrence of the failure or reduced performance. With the present invention, vibrations in the process and/or process device are monitored. Vibrations are detected and used to predict a failure, an impending failure, or reduced performance of the process device or process component.

Figure 1:
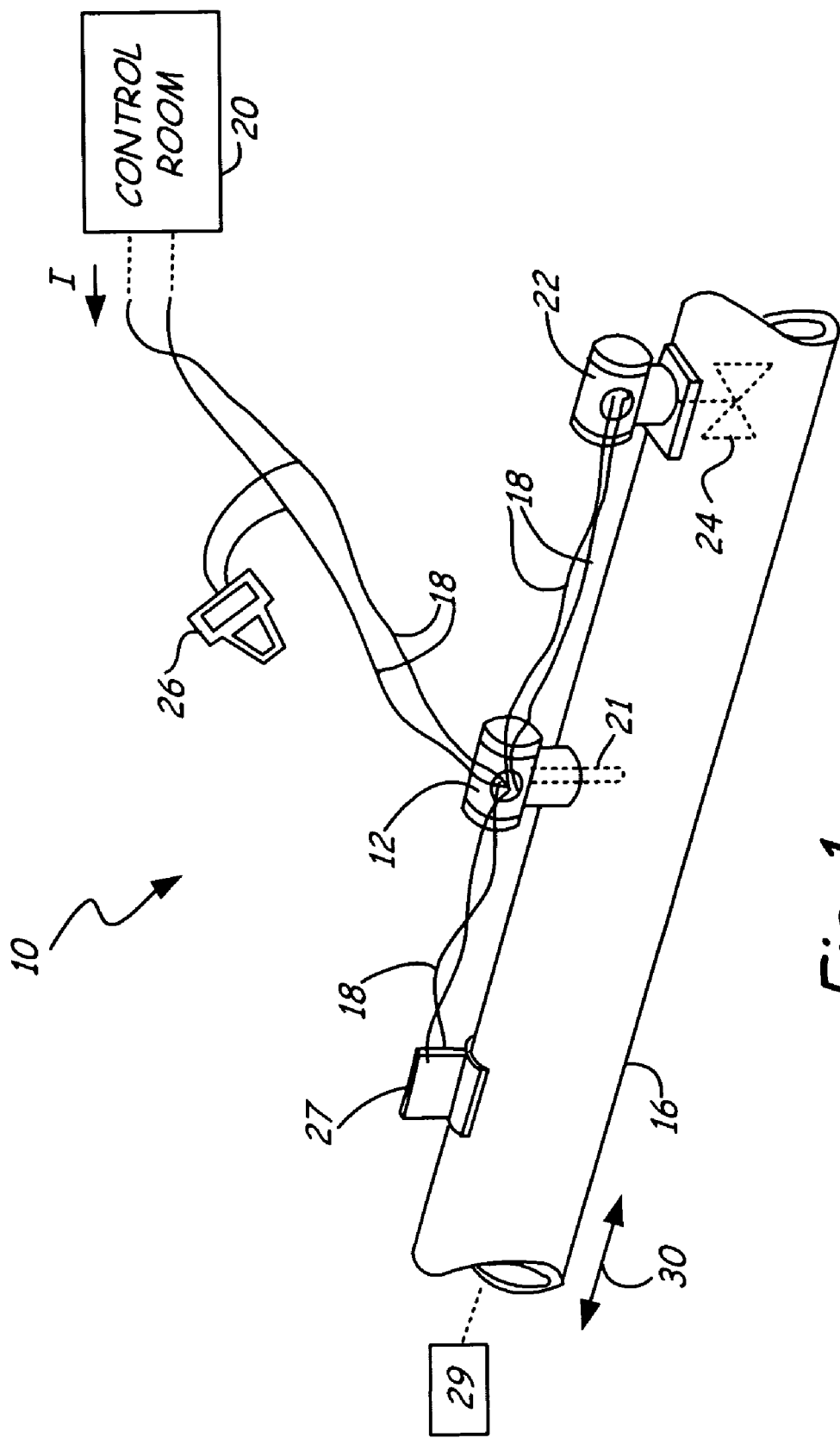
FIG. 1 is a diagram of an industrial process including a process transmitter coupled to process piping.

FIG. 1 is a diagram of process control system 10 which includes a transmitter 12 connected to process pipe 16. As discussed below, transmitter 12 is one type of process device and the present invention is applicable to any process device. Transmitter 12 is coupled to a two-wire process control loop 18 which operates in accordance with the Fieldbus, Profibus or HART® standard. However, the invention is not limited to these standards or a two-wire configuration. Two-wire process control loop 18 runs between transmitter 12 and the control room 20. In an embodiment in which loop 18 operates in accordance with the HART® protocol loop 18 can carry a current I which is representative of a sensed process variable. Additionally, the HART® protocol allows a digital signal to be superimposed on the current through loop 18 such that digital information can be sent to or received from transmitter 12. When operating in accordance with the Fieldbus standard, loop 18 carries a digital signal and can be coupled to multiple field devices such as other transmitters.

The present invention is applicable to any process device which is used in a process control environment. In general, process devices, such as transmitter 12 shown in FIG. 1 are used to measure, monitor or control process variables.

Process variables are typically the primary variables which are being controlled in a process. As used herein, process variable means any variable which describes the condition of the process such as, for example, pressure, flow, temperature, product level, pH, turbidity, vibration, position, motor current, any other characteristic of the process, etc. Control signal means any signal (other than a process variable) which is used to control the process. For example, control signal means a desired process variable value (i.e. a setpoint) such as a desired temperature, pressure, flow, product level, pH or turbidity, etc., which is adjusted by a controller or used to control the process. Additionally, a control signal means, calibration values, alarms, alarm conditions, the signal which is provided to a control element such as a valve position signal which is provided to a valve actuator, an energy level which is provided to a heating element, a solenoid on/off signal, etc., or any other signal which relates to control of the process. A diagnostic signal as used herein includes information related to operation of devices and elements in the process control loop, but does not include process variables or control signals. For example, diagnostic signals include valve stem position, applied torque or force, actuator pressure, pressure of a pressurized gas used to actuate a valve, electrical voltage, current, power, resistance, capacitance, inductance, device temperature, stiction, friction, full on and off positions, travel, frequency, amplitude, spectrum and spectral components, stiffness, electric or magnetic field strength, duration, intensity, motion, electric motor back emf, motor current, loop related parameters (such as control loop resistance, voltage, or current), or any other parameter which may be detected or measured in the system. Furthermore, process signal means any signal which is related to the process or element in the process such as, for example, a process variable, a control signal or a diagnostic signal. Process devices include any device which forms part of or couples to a process control loop and is used in the control or monitoring of a process.

As discussed above, FIG. 1 is a diagram showing an example of a process control system 10 which includes process piping 16 which carries a process fluid and two wire process control loop 18 carrying loop current I. A transmitter 12, controller 22, which couples to a final control element in the loop such as an actuator, valve, a pump, motor or solenoid, communicator 26, and control room 20 are all part of process control loop 18. It is understood that loop 18 is shown in one configuration and any appropriate process control loop may be used such as a 4–20 mA loop, 2, 3 or 4 wire loop, multi-drop loop and a loop operating in accordance with the HART®, Fieldbus or other digital or analog communication protocol. In operation, transmitter 12 senses a process variable such as flow using sensor 21 and transmits the sensed process variable over loop 18. The process variable may be received by controller/valve actuator 22, communicator 26 and/or control room equipment 20. Controller 22 is shown coupled to valve 24 and is capable of controlling the process by adjusting valve 24 thereby changing the flow in pipe 16. Controller 22 receives a control input over loop 18 from, for example, control room 20, transmitter 12 or communicator 26 and responsively adjusts valve 24. In another embodiment, controller 22 internally generates the control signal based upon process signals received over loop 18. Communicator 26 may be the portable communicator shown in FIG. 1 or may be a permanently mounted process unit which monitors the process and performs computations. Process devices include, for example, transmitter 12 (such as a 3051S transmitter available from Rosemount Inc. of Chanhassen, Minn.), controller 22, communicator 26 and control room 20 shown in FIG. 1. A diagnostic unit 27 is also illustrated in FIG. 1 and can include a sensor, such as the vibration sensors discussed herein, which is not separately used to sense a process variable. Another type of process device is a PC, programmable logic unit (PLC) or other computer coupled to the loop using appropriate I/O circuitry to allow monitoring, managing, and/or transmitting on the loop.

Any of the process devices 12, 20, 22, 26 or 27 shown in FIG. 1 may include a diagnostic capability in accordance with the present invention.

Any of the process devices shown in FIG. 1 which physically couples to the industrial process, for example, to process piping 16 can include a sensor to sense vibration in accordance with the invention. During process operation, vibrations occur and are transmitted to process components. A generic process component 29 is illustrated in FIG. 1 and can comprise any physical item which receives or generates vibrations from operation of the process. Component 29 can comprise components within the process device which perform the diagnostics. The vibrations can be from various sources such as motors, cavitation or fluid movement, actuators, etc. The vibrations are physically carried along the process components which are illustrated by arrow 30. These vibrations can cause the degradation and ultimate failure of process component 29. Process component 29 can be any component which is coupled to industrial process 10. Example process components include process piping, valves, pumps, sensors, transmitters, electrical equipment, mechanical equipment, control elements, conduits, tanks, actuators, agitators, or other components or devices.

In accordance with one embodiment of the present invention, a process device, such as transmitter 12 includes a vibration sensor configured to sense vibrations occurring in the industrial process. The vibration sensor can be any type of vibration sensor such as an accelerometer. Diagnostic circuitry in transmitter 12 or at a remote location monitors the sensed vibrations and is capable of diagnosing a failure or an impending failure, or degradation of performance of process component 29. The component 29 can, in some embodiments, comprise a component of the process device which performs the diagnostics. In other embodiments, the component 29 is physically separated from the device which performs the diagnostics. An output can be provided by transmitter 12, for example to control room 20 over two-wire process control loop 18, which provides an indication of the failure of impending failure of process component 29. Using this information, an operator can repair or replace a failed component 29, or repair or replace a component 29 prior to its ultimate failure. This allows any maintenance of the process 10 to occur at a scheduled time. This can be particularly advantageous if the repair or replacement of the component 29 requires the process 10 to be shut down. Further, some components can fail either catastrophically or in a manner which causes other components to be damaged, or cause the release of unsafe product to the environment. By providing an indication that the component 29 may fail in the near future, or predicting a time of ultimate failure, the component 29 can be repaired or replaced prior to that ultimate failure.

Figure 2:
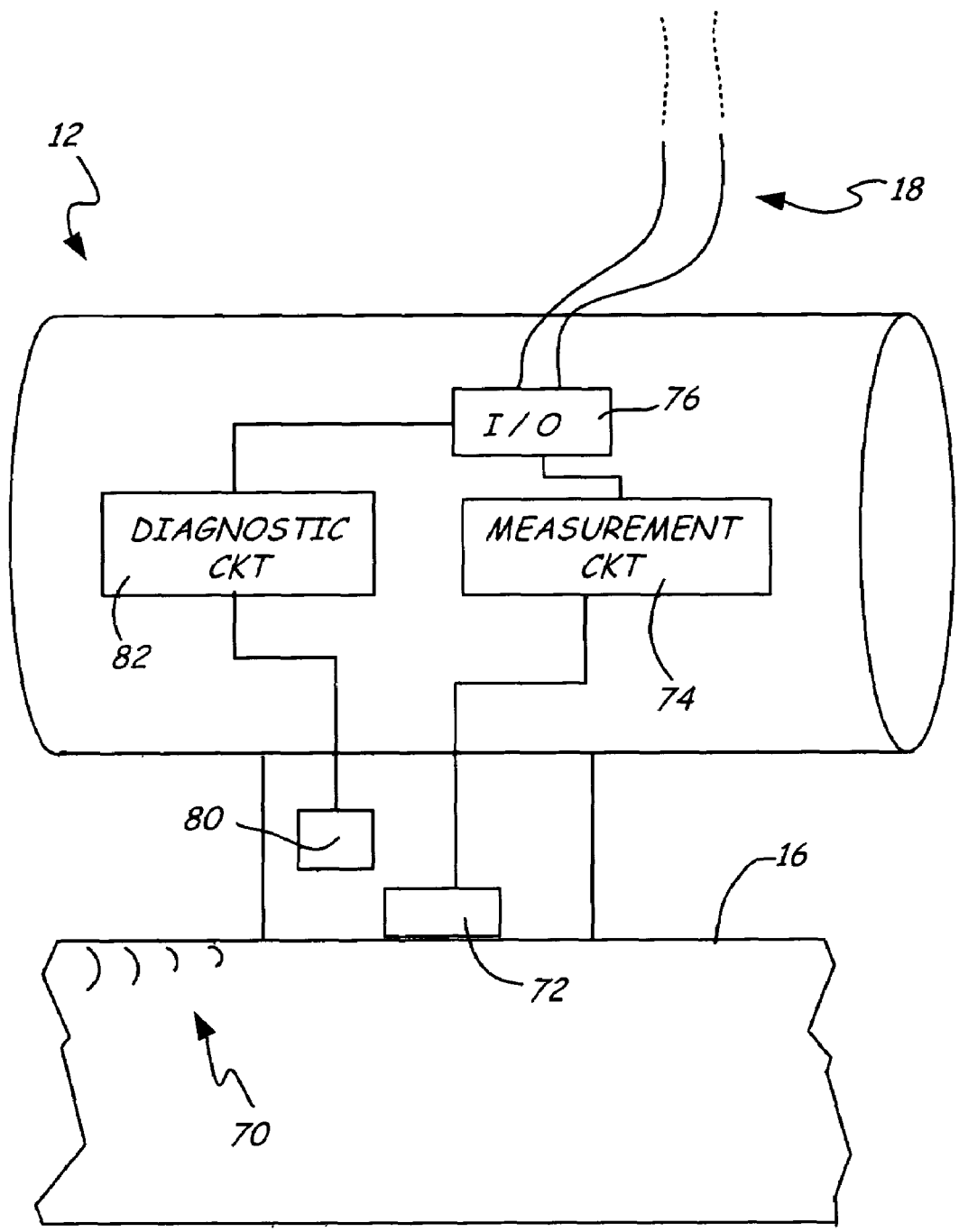
FIG. 2 is a block diagram of circuitry and components in the process transmitter of FIG. 1.

FIG. 2 is a diagram showing process transmitter 12 coupled to process piping 16. Vibrations 70 are shown traveling through the industrial process. For example, the vibration 70 may be carried by process piping 16, process fluid within piping 16, or other physical couplings to transmitter 12.

Transmitter 12 includes a process variable sensor 72. Process variable sensor 72 can be configured to sense any type of process variable such as flow, pressure, temperature, or others. Process variable sensor 72 couples to measurement circuitry 74 which provides a process variable signal to I/O circuitry 76. I/O circuitry 76 is configured to transmit information related to the sensed process variable over two-wire process control loop 18. In some embodiments, I/O circuitry 76 can also receive power through process control loop 18 which is used to completely power the circuitry and components of transmitter 12.

A vibration sensor 80 in transmitter 12 is configured to sense vibrations 70 and provide a vibration sensor signal to diagnostic circuitry 82. Diagnostic circuitry 82 monitors the vibrations 70 sensed by vibration sensor 80 and provides an output via I/O circuitry 76 which provides an indication of a failure or impending failure of a process component 29.

The vibrations 70 in process piping 16 and process equipment are disruptive to the industrial process 10 and can result in damage to the process piping 16, instrumentation, and other plant components. Process transmitter 12 provides a built-in capability for monitoring the vibrations and detecting and predicting potential damage. By detecting harmful vibrations, transmitter 12 can prevent the need to replace damaged process instruments or other equipment. Plant integrity and safety can also be maintained by preventing process leakage due to broken piping or damage to other equipment that provides containment of the process.

In some embodiments, the vibration diagnostics of the present invention can avoid or reduce plant downtime by predicting the impending loss of a measurement instrument or a control instrument while there is still time to replace or repair the device. Vibration information can also be provided to other devices. Data compression algorithms can be used for such transmissions. A diagnostic indication can be provided on two-wire process control loop 18. For example, a HART status or other alert can be transmitted over loop 18. Such an alert can be provided to the control room 20 when the sensed vibration exceeds a predefined threshold amplitude. The vibration diagnostic alert can be triggered if the instantaneous vibration exceeds a threshold level or, for example, if the cumulative vibration have exceeded a threshold. The accumulation can be over the sensor lifetime, partial lifetime (windowed), or an accumulation of peaks or other vibration signatures. Trends or specific vibration signatures in the vibrations can also be used for diagnostics. Because the vibration diagnostics of the present invention can be integrated with a process device, additional diagnostic devices are not required. The configuration of the vibration based diagnostics can simply be integrated with existing process information systems used in the industrial processes.

The vibration sensor 80 can be any type of vibration sensor. Many vibration sensors operate along a single axis and are capable of only sensing vibrations along that axis. However, in one embodiment additional sensors or multi-axis sensors are used to sense vibrations along more than one axis or to profile vibration at various locations in the process device. The additional sensed vibrations can be used by the diagnostic circuitry 82 to provide further diagnostics. Additionally, vibration sensors 80 can be placed in more than one location in the process transmitter 12. These additional sensors can also be used to provide additional vibration based process diagnostics. The scope of the diagnostics can be expanded by comparing or analyzing vibration measurements from more than one process device located in the process system. The additional measurements can be used to provide information related to the overall health of the process or plant. Vibration measurements made near the connection of a process device to the process can be used to detect specific process disruptions such as air hammer from abrupt valve closure, cavitation, aggressive chemical reactions or other process disturbances as well as actual or impending failure of pumps, rotating equipment or similar types of failures.

Vibration of process piping is also disruptive to the process and may degrade the accuracy of flow measurements such as those provided by vortex flowmeters or differential pressure based flowmeters that require an optimized profile. Detection of disruptive vibration can subsequently be used in the flow control algorithm, for example through curve fitting or other techniques to adjust the flow rate to settings that minimize or eliminate these disruptions to the process and improve flow measurements. The detected vibration. 70 can be used to compensate, or "trim", flow or other process variable measurements while the process is being disrupted.

Although the I/O circuitry 76, measurement circuitry 74 and diagnostic circuitry 82 are shown as separate components in FIG. 2, these circuit blocks can be implemented in shared circuitry and/or software. For example, many of these functions can be implemented in a digital processor. In addition to comparing sensed vibrations, or cumulative sensed vibrations, to a fixed threshold, other diagnostic techniques can be employed by diagnostic circuitry 82. For example, an expert system can be implemented using if/then rules. Diagnostics can be based upon the frequency spectrum of sensed vibrations. Complex processing can be employed such as neural networks, fuzzy logic, etc.

Figure 3:
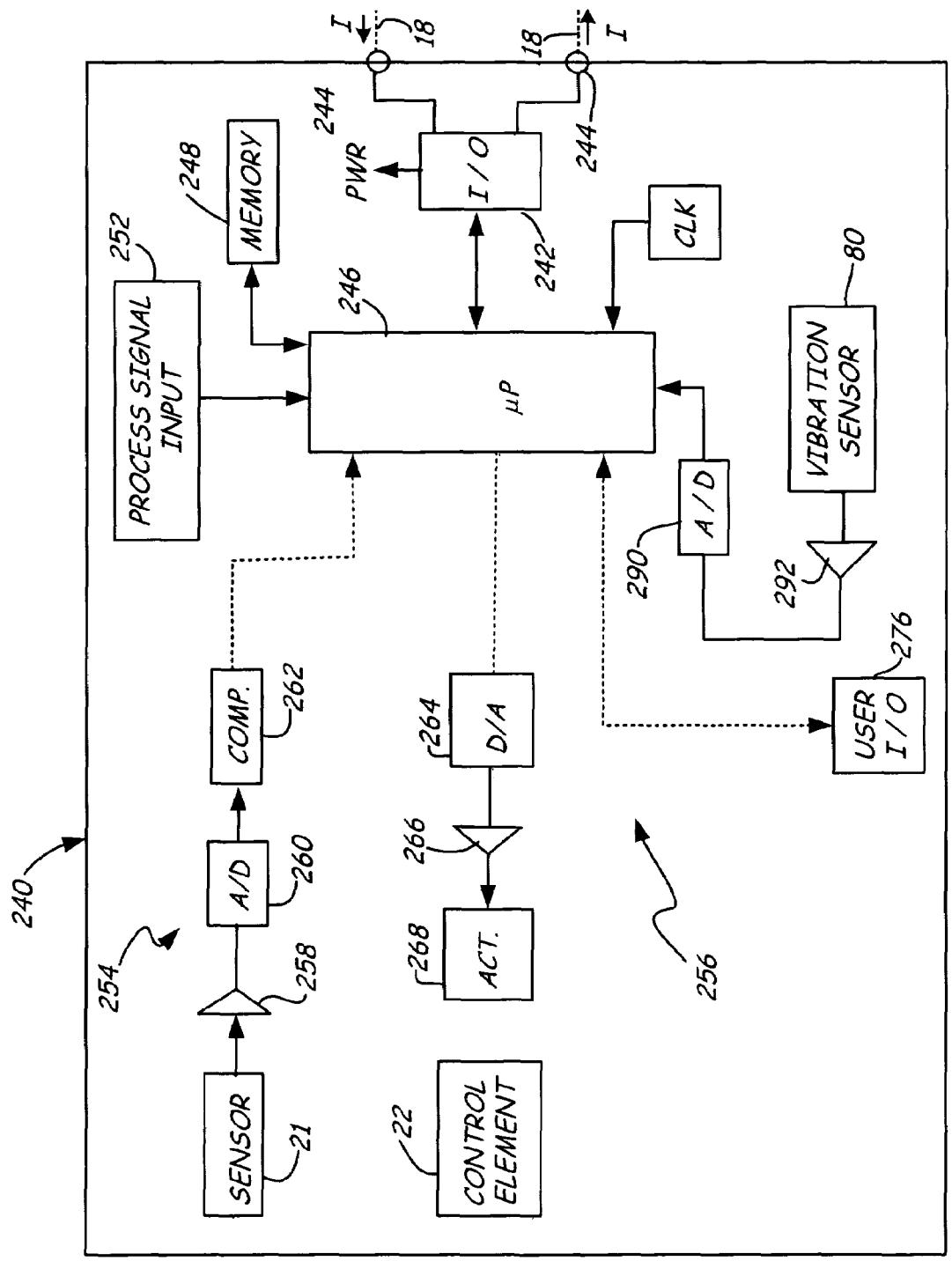
FIG. 3 is a simplified block diagram of a process device for use in implementing the present invention.

FIG. 3 is a block diagram of a process device 240 forming part of loop 18. Device 240 is shown generically and may comprise any process device used to implement the vibration diagnostics such as transmitter 12, controller 22, communicator 26, unit 27 or control room equipment 20 shown in FIG. 1. Control room equipment 20 may comprise, for example, a DCS system implemented with a PLC and controller 22 may also comprise a "smart" motor and pump. Process device 240 includes I/O circuitry 242 coupled to loop 18 at terminals 244. I/O circuitry has preselected input and output impedance known in the art to facilitate appropriate communication from and to device 240. Device 240 includes microprocessor 246, coupled to I/O circuitry 242, memory 248 coupled to microprocessor 246 and clock 250 coupled to microprocessor 246. Microprocessor 246 receives a process signal input 252. Process signal input block 252 is intended to signify input of any process signal, and as explained above, the process signal input may be a process variable, or a control signal and may be received from loop 18 using I/O circuitry 242 or may be generated internally within process device 240. Process device 240 is shown with a sensor input channel 254 and a control channel 256. Typically, a transmitter such as transmitter 12 will exclusively include sensor input channel 254 while a controller such as controller 22 will exclusively include a control channel 256. Other devices on loop 18 such as communicator 26 and control room equipment 20 may not include channels 254 and 256. It is understood that device 240 may contain a plurality of channels to monitor a plurality of process variables and/or control a plurality of control elements as appropriate.

Sensor input channel 254 includes sensor 21, sensing a process variable and providing a sensor output to amplifier 258 which has an output which is digitized by analog to digital converter 260. Channel 254 is typically used in transmitters such as transmitter 12. Compensation circuitry 262 compensates the digitized signal and provides a digitized process variable signal to microprocessor 246. In one embodiment, channel 254 comprises a diagnostic channel which receives a diagnostic signal.

When process device 240 operates as a controller such as controller 22, device 240 includes control channel 256 having control element 24 such as a valve, for example. Control element 24 is coupled to microprocessor 246 through digital to analog converter 264, amplifier 266 and actuator 268. Digital to analog converter 264 digitizes a command output from microprocessor 246 which is amplified by amplifier 266. Actuator 268 controls the control element 24 based upon the output from amplifier 266. In one embodiment, actuator 268 is coupled directly to loop 18 and controls a source of pressurized gas (not shown) to position control element 24 in response to the current I flowing through loop 18. In one embodiment, controller 22 includes control channel 256 to control a control element and also includes sensor input channel 254 which provides a diagnostic signal such as valve stem position, force, torque, actuator pressure, pressure of a source of pressurized air, etc.

In one embodiment, I/O circuitry 242 provides a power output used to completely power other circuitry in process device 240 using power received from loop 18. Typically, field devices such as transmitter 12, or controller 22 are powered from loop 18 while communicator 26 or control room 20 has a separate power source. As described above, process signal input 252 provides a process signal to microprocessor 246. The process signal may be a process variable from sensor 21, the control output provided to control element 24, a diagnostic signal sensed by sensor 80, or a control signal, process variable or diagnostic signal received over loop 18, or a process signal received or generated by some other means such as another I/O channel.

A user I/O circuit 276 is also connected to microprocessor 246 and provides communication between device 240 and a user. Typically, user I/O circuit 276 includes a display and audio for output and a keypad for input. Typically, communicator 26 and control room 20 includes I/O circuit 276 which allows a user to monitor and input process signals such as process variables, control signals (setpoints, calibration values, alarms, alarm conditions, etc.). A user may also use circuit 276 in communicator 26 or control room 20 to send and receive such process signals to transmitter 12 and controller 22 over loop 18. Further, such circuitry could be directly implemented in transmitter 12, controller 22 or any other process device 240.

FIG. 3 also illustrates vibration sensor 80 which can be an individual sensor, or it can be formed from multiple sensors or components. In one embodiment, sensor 80 couples to microprocessor 246 for example through an analog to digital converter 290 and an amplifier 292. Microprocessor 246 can monitor the sensed vibrations and provide an indication of a failure or impending failure of a process component. For example, the microprocessor can compare the sensed vibration to a baseline value or a nominal value. This information can be stored in memory 248. The baseline and nominal values can change based upon the mode of operation of the process, or other factors. The baseline can be a particular frequency spectrum or signature and can be based upon observed history of process operation. Further, the diagnostics performed by microprocessor 246 can be based upon trends in the sensed vibrations. For example, an increase, either gradual or suddenly over time, or periodic spikes or other anomalies in the sensed vibrations, can be an indication of a failure or an impending failure of a process component. Similarly, if the sensed vibrations suddenly spike, the microprocessor 246 can provide a diagnostic output indicating that a process component 29 may fail or has failed. These values, trends, or training profiles can also be stored in memory 248. The diagnostics can be based upon a simple comparison, or more complex mathematical techniques such as observing averages or rolling averages of measurements, fuzzy logic techniques, neural network techniques, or expert system techniques based upon a series of rules and/or threshold comparison. In various embodiments, the ability of the present invention to provide predictive diagnostics can be advantageous because it provides time for service personnel to service the process component prior to its ultimate failure.

The diagnostic output of the present invention can be used to provide an output signal, provide a visual indication to an operator or provide a communication signal for transmission to a control room or other diagnostic annunciation.

As discussed above, the diagnostics can be based upon various techniques which employ the sensed vibration. For example, the diagnostics can utilize vibration trends over a period of time. This information can be used to correlate with wear of bearings or pump components. It can also be used to provide an accumulative measure of exposure of process components to vibration and can be used to predict the process piping or mechanical connections, such as mounting hardware or brackets are subject to imminent failure. Additionally, the diagnostics circuitry can be used to correlate vibration signals with various steps or occurrences which occur during operation of the industrial process. For example, an aggressive chemical reaction may have a particular vibration signature. In some embodiments, a simple relative measure of vibration, for example trending better, trending worse or staying constant, may be sufficient if calibration or characterization of the vibration sensor is performed. An absolute measure of vibration can also be utilized to perform the diagnostics.

The vibration sensor 80 can be any appropriate vibration sensor. One known vibration detection and measurement sensor is an accelerometer. There are a number of different accelerometer technologies which are currently employed including capacitive, electrodynamic, piezoelectric, and others. The accelerometer produces an output signal that is related to the sensed vibration. The output signal can have a linear or other relationship to the strength of the vibration or the frequency of the vibration. Another example diagnostics sensor can be embodied in a MEMS configuration in which a cantilever is utilized to sense vibrations.

Piezoelectric accelerometers are fairly rugged and have a wide signal bandwidth, in the order of tens of kilohertz, covering much of the audio range. One example sensor is available from PCB Piezoelectronics and identified as the IMI Sensor Series 660, which is a family of low cost embeddable accelerometers. Various configurations are available including two wire with and without signal processing and three wire low power. For example, the low power configuration operates over an extended temperature range and can be mounted directly to processes which undergo a wide temperature variation. An excitation voltage is applied, for example between 3 and 5 volts DC and the current throughout the sensor is on the order of 750 µA.

Another example accelerometer is identified as the MMA series available from Motorola. These accelerometers include various options such as surface mount integrated circuit packages, temperature compensation, integral signal conditioning and filtering, self testing and fault latch capabilities. These accelerometers use a capacitive sensing technique that can be modeled as two stationary plates with a movable plate placed therebetween. The center plate is deflected from its rest position when the system is subject to acceleration.

Although the present invention has been described with reference to preferred embodiments, workers skilled in the art will recognize that changes may be made in form and detail without departing from the spirit and scope of the invention. The process coupling can be any type of coupling which is capable of transferring vibrations to the vibration sensor. The process coupling includes couplings which directly mount the vibration sensor to the process. The vibrations can be received through a process connection, mounting arrangement, wiring system, etc. In some embodiments, the invention can be embodied in any type of process device. In one embodiment, by integrating vibration diagnostics with a process device, additional diagnostic devices are not required. The process device can perform diagnostics on itself, in other words, the component 29 can be a component of the device which receives the vibrations and/or performs the diagnostics.

What is claimed is:

1. An apparatus for use in an industrial process control or monitoring system, comprising:
    a process device for coupling to an industrial process which includes a process transmitter or controller to monitor or control the industrial process and communicate;
    a process coupling configured to couple the process device to a process which includes piping carrying a process fluid, the process coupling configured to receive vibrations from the process;

a vibration sensor configured to receive vibrations from the process which are transferred from the process through the process coupling and to sense vibrations and provide a sensed vibration signal; and diagnostic circuitry located in the process device configured to receive the sensed vibration signal and responsively provide a diagnostic output related to a process disturbance or operation of a process component;

wherein the process device includes a process variable sensor separate from the vibration sensor configured to sense a process variable; and wherein the diagnostic output is based upon a comparison of an accumulation of the sensed vibrations over at least a partial lifetime of use of the vibration sensor to a threshold.

2. The apparatus of claim 1 wherein the process device includes a control element separate from the vibration sensor configured to control operation of the process.

3. The apparatus of claim 1 wherein the process device includes an input configured to receive a process signal.

4. The apparatus of claim 1 wherein the process device includes output circuitry including communication circuitry configured to couple to a two-wire process control loop.

5. The apparatus of claim 1 wherein the vibrations are carried through process components.

6. The apparatus of claim 1 wherein the vibration sensor comprises an accelerometer.

7. The apparatus of claim 1 wherein the vibration sensor is configured to sense vibrations along one axis.

8. The apparatus of claim 1 wherein the vibration sensor is configured to sense vibrations along more than one axis.

9. The apparatus of claim 1 wherein the output from the diagnostic circuitry is transmitted on a process control loop.

10. The apparatus of claim 1 wherein the diagnostic output is related to failure of a process component.

11. The apparatus of claim 1 wherein the diagnostic output is related to degradation in performance of a process component.

12. The apparatus of claim 1 wherein the diagnostic output is related to an impending failure of a process component.

13. The apparatus of claim 1 wherein the diagnostic output is based upon a comparison of sensed vibrations to a base line level.

14. The apparatus of claim 13 wherein the base line level is determined based upon history of the process.

15. The apparatus of claim 1 wherein the diagnostic output is based upon trends in the sensed vibrations.

16. The apparatus of claim 1 wherein the diagnostic output is used to adjust a control algorithm.

17. The apparatus of claim 1 wherein the diagnostic output is used to compensate a process variable measurement.

18. The apparatus of claim 1 wherein the diagnostic output is based upon a frequency spectrum of the sensed vibrations.

19. The apparatus of claim 1 wherein the diagnostic output is based upon rules.

20. The apparatus of claim 1 wherein the diagnostic circuitry implements a neural network.

21. The apparatus of claim 1 wherein the diagnostic circuitry implements fuzzy logic.

22. The apparatus of claim 1 wherein the diagnostic output is based upon sensed spikes in the vibration signal.

23. The apparatus of claim 1 wherein the diagnostic output is based upon a rolling average of the vibration signal.

24. The apparatus of claim 1 wherein the vibration sensor is selected from a group of vibration sensors including of capacitive, electrodynamic, piezoelectric and Micro-Electro-Mechanical Systems (MEMS).

25. The apparatus of claim 1 wherein the diagnostic output is correlated with process operation.

26. The apparatus of claim 1 including a plurality of process devices configured to sense vibrations.

27. The apparatus of claim 1 wherein the process device is completely powered from a process control loop.

28. The apparatus of claim 1 wherein the process device is configured to couple to a process control loop selected from the group of process control loops consisting of two, three and four wire process control loops.

29. The apparatus of claim 1 wherein the vibration sensor senses vibration in the process received through a mounting arrangement.

30. The apparatus of claim 1 wherein the vibration sensor senses vibration in the process received through a wiring system.

31. A method of monitoring operation of an industrial process control system, comprising:

physically coupling a process device using a process coupling to an industrial process which carries a process fluid in process piping and which includes process transmitters or controllers to monitor or control the industrial process which communicate;

receiving vibrations from the process through the process coupling;

sensing process vibrations with a vibration sensor in the process device, the vibrations received through the physical coupling and transferred from the process through the process coupling and to the vibration sensor;

diagnosing operation of a process component or a process disturbance based upon the sensed vibrations;

sensing a process variable with a process variable sensor in the process device which is separate from the vibration sensor; and wherein the diagnostic operation is based upon a comparison of an accumulation of sensed vibrations over at least a partial lifetime of use of the vibration sensor to a threshold.

32. The method of claim 31 including controlling operation of the process with a control element which is separate from the vibration sensor.

33. The method of claim 31 including outputting diagnostic data on a two-wire process control loop.

34. The method of claim 31 wherein the process vibrations are carried through process components.

35. The method of claim 31 wherein sensing vibrations comprises sensing vibrations along one axis.

36. The method of claim 31 wherein sensing vibrations comprises sensing vibrations along more than one axis.

37. The method of claim 31 wherein the diagnosing is related to failure of a process component.

38. The method of claim 31 wherein the diagnosing is related to an impending failure of a process component.

39. The method of claim 31 wherein the diagnosing is based upon a comparing of sensed vibrations to a base line level.

40. The method of claim 39 wherein the base line level is determined based upon history of the process.

41. The method of claim 31 wherein the diagnosing is based upon trends in the sensed vibrations.

42. The method of claim 31 including adjusting a control algorithm based upon the diagnosing operation.

43. The method of claim 31 including compensating a process variable measurement based upon the diagnosing.

44. The method of claim 31 wherein the diagnosing is based upon a frequency spectrum of the sensed vibrations.

45. The method of claim 31 wherein the diagnosing is based upon rules.

46. The method of claim 31 wherein the diagnosing is implemented in a neural network.

47. The method of claim 31 wherein the diagnosing is implemented in fuzzy logic.

48. The method of claim 31 wherein the diagnosing operation is based upon sensed spikes in the sensed vibrations.

49. The method of claim 31 wherein the diagnosing operation is based upon a rolling average of the sensed vibrations.

50. The method of claim 31 including correlating the diagnosing with process operation.

* * * * *

UNITED STATES PATENT AND TRADEMARK OFFICE
CERTIFICATE OF CORRECTION

| | | |
|---|---|---|
| PATENT NO. | : 7,627,441 B2 | Page 1 of 1 |
| APPLICATION NO. | : 10/675014 | |
| DATED | : December 1, 2009 | |
| INVENTOR(S) | : Randy J. Longsdorf et al. | |

It is certified that error appears in the above-identified patent and that said Letters Patent is hereby corrected as shown below:

Title page, item (57) Abstract,
Line 1, replace "An" with --A--.
Line 2, after "process" insert --which includes piping carrying a process fluid--.
Line 3, after "vibrations" insert --from the process--.
Line 4, after "output" insert --related to a process disturbance or operation of a process component--.

Title page, item (56) References Cited,
U.S. Patent Documents, Page 2, under 4,279,013, replace "340/870.37" with --364/105--.
U.S. Patent Documents, Page 2, replace "5,410,494" with --5,410,495--.
U.S. Patent Documents, Page 3, under 5,796,006, replace "73/658" with --73/661--.
Other Publications, replace ""Integration of Signal Validation Modules for Sensor Monitoring,"" with --"Integration of Multiple Signal Validation Modules for Sensor Monitoring"--.

Column 10, Claim 31,
Line 31, insert --and-- after ";".
Line 32, delete "and" after ";".

Signed and Sealed this
Twenty-ninth Day of May, 2012

David J. Kappos
*Director of the United States Patent and Trademark Office*